United States Patent [19]

Jeffery

[11] Patent Number: 5,142,774
[45] Date of Patent: Sep. 1, 1992

[54] APPARATUS AND METHOD FOR LOADING FASTENER COLLARS ONTO A MANDREL

[75] Inventor: Keith S. Jeffery, Rhinebeck, N.Y.

[73] Assignee: Huck Manufacturing Co., Irvine, Calif.

[21] Appl. No.: 707,485

[22] Filed: May 30, 1991

[51] Int. Cl.$^5$ .................. B23Q 7/10; B23P 19/04
[52] U.S. Cl. .................. 29/810; 29/406; 29/433; 29/467
[58] Field of Search .......... 29/271, 272, 433, 450, 29/451, 419.2, 445, 406, 455.1, 464, 467, 809, 810, 813, 821, 822, 823; 221/212, 224; 222/202, 203; 81/54

[56] References Cited

U.S. PATENT DOCUMENTS

| 3,210,834 | 10/1965 | Orr et al. | 29/810 X |
| 3,791,007 | 2/1974 | Seleznev et al. | 29/433 X |
| 4,092,769 | 6/1978 | Dickson, Jr. et al. | 29/433 X |
| 4,270,237 | 6/1981 | Breeze, Jr. et al. | 81/54 X |
| 4,338,714 | 7/1982 | Powderly | 29/433 |
| 4,388,753 | 6/1983 | Brookes | 29/433 |
| 5,007,164 | 4/1991 | Kato | 29/433 |

FOREIGN PATENT DOCUMENTS 164528   6/1989   Japan .................. 29/813

*Primary Examiner*—Joseph M. Gorski
*Assistant Examiner*—Peter Dungba Vo
*Attorney, Agent, or Firm*—Harness, Dickey & Pierce

[57] ABSTRACT

A magnetic means for centering a flexible elongated mandrel within a vertical passage (chute) without any physical connection between the mandrel and the passage surface. The mandrel carries a tapered nose piece that includes an elongated magnetized rod. An array of cooperating magnets is arranged around the perimeter of the passage, so that the magnetic circuits of the rod and perimeter magnets interact to produce a radial repulsion of the rod to a position on the passage axis.

15 Claims, 1 Drawing Sheet

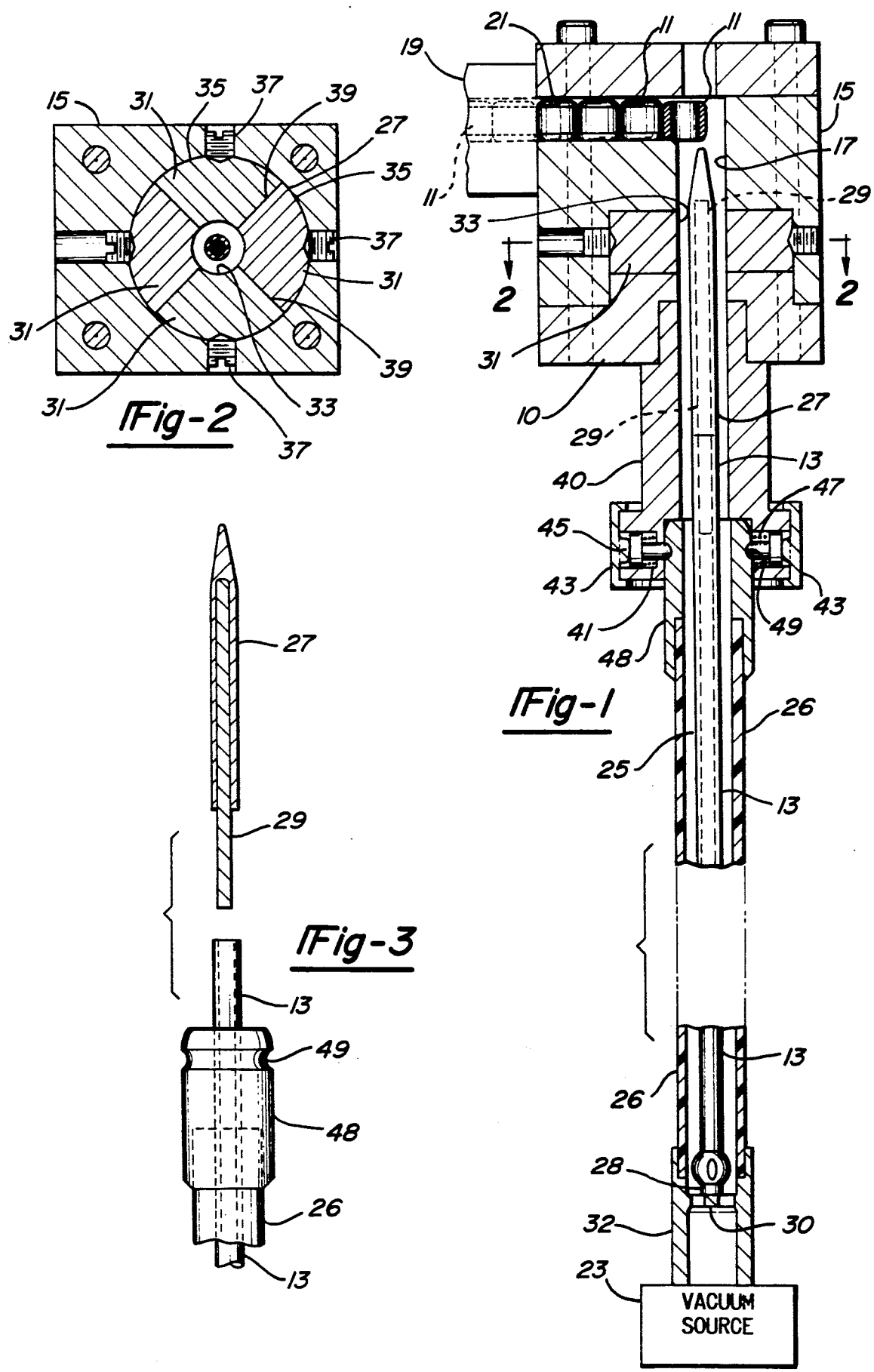

APPARATUS AND METHOD FOR LOADING FASTENER COLLARS ONTO A MANDREL

BACKGROUND OF THE INVENTION

1. Field of the Invention

The present invention is directed to pin and collar type fasteners and is particularly concerned with an automated assembly for stringing fastener collars onto a magnetically centered mandrel.

2. Description of Prior Developments

U.S. patent application Ser. No. 599,184, incorporated herein be reference, discloses a method and apparatus for loading fastener collars into a fastener installation machine. The method includes the step of stringing individual fastener collars onto an elongated flexible mandrel that extends within a surrounding flexible tube.

Typically, the flexible mandrel and surrounding flexible tube will have a length of about twelve feet. The mandrel can have a diameter ranging from about one eighth inch up to about one half inch, depending on the size fastener collar being strung onto the mandrel. In order to string the annular fastener collars onto the flexible mandrel, the surrounding flexible tube may be suspended in a vertical position from a chute housing associated with a vibratory bowl type collar feeding apparatus.

The collars are sequentially fed from the feeding apparatus into the upper end of a chute. At this point, the collars are allowed to drop down through the chute onto the upper end of the mandrel which is located within the suspended flexible tube. A vacuum pump may be connected to the lower end of the suspended flexible tube to exert a vacuum force on the collars as they descend along the mandrel. The vacuum force helps to ensure a smooth downward flow of the collars along the mandrel, and a relatively tight packing of the collars along the mandrel surface.

Substantially the entire length of the flexible mandrel is utilized for stringing and holding the fastener collars. Each flexible mandrel will hold or support a relatively large number of fastener collars. For example, assuming a collar length of one half inch and a mandrel length of about twelve feet, a single flexible mandrel can serve as a stringer for over two hundred fastener collars.

In order to facilitate collar loading, the upper end of the flexible mandrel should be centered in the chute passage. Otherwise, a given fastener collar may have its end surface strike against the tip end of the mandrel so as to hang up or jam in the chute passage, i.e., not travel downwardly around and along the mandrel surface. Such jams are of course undesirable in that they cause temporary stoppage of the collar stringing process until the particular collar is removed from the chute structure. Centering of the flexible mandrel in the chute passage is made somewhat difficult because of the fact that the entire vertical length of the mandrel should be unconnected to the surrounding tube or chute structure in order to permit the annular fastener collars to freely pass downwardly along and around the mandrel surface.

Accordingly, a need exists for a mandrel centering device which coaxially aligns a mandrel within a chute without physical contact between the mandrel and chute.

SUMMARY OF THE INVENTION

The present invention has been developed to fulfill the needs noted above and is, therefore, directed to a magnetic apparatus for centering the upper end of the flexible mandrel in the chute passage without having any physical structure or connection between the mandrel and the surrounding passage surface. In one form of the invention, the flexible mandrel is connected to a tapered nose piece at its upper end for guiding the fastener collars onto the mandrel. An elongated magnetized rod is carried within the nose piece. A number of segment-shaped magnets are arranged in the chute housing in surrounding relation to the chute passage and to the magnetized nose piece connected to the mandrel. Magnetic polarities of the elongated magnetized rod and surrounding magnets are such that the nose piece is magnetically repulsed or forced away from the surrounding magnets. By arranging the individual magnets symmetrically relative to the passage, the various magnets will exert equalized repulsive forces on the magnetized rod in the nose piece thereby centering the nose piece in the chute passage.

BRIEF DESCRIPTION OF THE DRAWINGS

Various other objects, features and attendant advantages of the present invention will be more fully appreciated from the following detailed description when considered in connection with the accompanying drawings, in which the same reference numbers designate the same or corresponding parts throughout.

FIG. 1 is a sectional view taken through an apparatus embodying features of the invention;

FIG. 2 is a transverse sectional view taken on line 2—2 in FIG. 1; and

FIG. 3 is a fragmentary exploded view of components used in the FIG. 1 apparatus.

DETAILED DESCRIPTION OF THE PREFERRED EMBODIMENTS

The drawings show an apparatus 10 for assembling annular fastener collars 11 into a string configuration on a flexible mandrel 13. The apparatus includes a chute housing 15 constructed to form a vertical chute passage 17. A conventional vibratory bowl feeder mechanism 19, or other conveyor mechanism, may be located to supply fastener collars to the chute passage.

The fastener collars 11 move sequentially in a left-to-right direction within a horizontal channel 21 to enter into the upper end of chute passage 17. As each annular fastener collar leaves channel 21 it begins to fall within passage 17. The gravitational descent of each collar may be augmented by a vacuum force derived from a vacuum pump 23 located at the lower end of a flexible tube 26 that surrounds mandrel 13. The vacuum force is applied within the annular space 25 between the outer surface of the mandrel and the inner surface of tube 26.

A tapered nose piece 27 formed of a low friction plastic material or the like is connected to the upper end of mandrel 13 for guidance of each collar 11 onto the mandrel. The mandrel is unconnected to housing 15 or tube 26, except that the lower end 28 of the mandrel rests against a central bridge wall 30 formed in a vacuum fitting 32. Typically, mandrel 13 will have a length on the order of twelve feet.

Because of its length and flexibility, the mandrel will not necessarily remain exactly centered relative to tube 26 or chute passage 17. Any off-centered disposition of the mandrel may be troublesome, especially at the upper end of the mandrel where the fastener collars initially fall onto and around the mandrel. For example, if the tapered upper end of nose piece 27 were to lay against the surface of passage 17, the fastener collars 11 would tend to pile up on the nose piece without telescoping and moving downwardly along the mandrel surface.

A magnetic assembly is carried by housing 15 and by nose piece 27 for centering the nose piece in chute passage 17. The magnetic centering assembly includes an elongated magnetized rod 29 carried within nose piece 27, with the upper end of the rod having a north polarity and the lower end of the rod having a south polarity or vice versa. The magnetic centering assembly further includes four segment-shaped magnets 31 mounted within housing 15 in surrounding concentric relation to chute passage 17. Each magnet 31 has an inner arcuate surface 33 in axial alignment with the chute passage surface, whereby the magnet inner surfaces form smooth continuations of the chute passage surface.

The four segment-shaped magnets 31 are individual magnetically polarized along radial lines extending from the axis of passage 17, such that each inner arcuate surface 33 of each magnet has a north polarity while each outer arcuate surface 35 of each magnet has a south polarity or vice versa.

When mandrel 13 is positioned so that the nose piece 27 is located within chute passage 17, the upper end portion of rod 29 will be located within the plane of the magnet assembly defined by magnets 31. The north pole of rod 29 will be repulsed from the north poles at the inner surfaces 33 of the segment-shaped magnets 31, thereby magnetically centering the nose piece in the chute passage. Rod 29 is sufficiently elongated that its south pole (at the lower end of the rod) does not magnetically interact with magnets 31.

The four segment-shaped magnets 31 are individually positioned in housing 15 by individual set screws 37. The primary purpose of the set screws is to prevent vibration of the magnets and/or circumferential dislocation thereof. The magnets have segmental configurations in order to increase the magnet mass and magnetic strength, especially at the inner surfaces 33 of the magnets.

Magnets 31 are preferably located so that their radial side edges 39 are in direct engagement with each other, such that the magnet assembly entirely surrounds the nose piece 27. Inner arcuate surfaces 33 of the magnets preferably are in axial alignment with the passage 17 surface so that the magnetic action of each surface 33 will be as close as possible to magnetized rod 29.

When a quantity of fastener collars 11 has accumulated in the annular space 25 between mandrel 13 and tube 26, the mandrel and tube are removed from chute housing 15 in order to attach another similar tube-mandrel assembly to the housing for forming additional collars into another string configuration. It is necessary that tube 26 have a detachable connection with chute housing 15. Any conventional quick-disconnect device ca be provided to form the necessary connection.

As shown in FIG. 1, the disconnect mechanism includes a vertical pipe 40 extending downwardly from housing 15. Two or more plungers 41 are slidably mounted in the pipe for radial movement toward or away from the pipe axis. A manually-rotatable collar 43 is carried on the pipe, with cam lobe elements 45 carried thereon. Each plunger is normally biased radially outwardly by a coil spring 47. However, by manually rotating collar 43, the cam lobe elements are enabled to move the plungers radially inwardly to the FIG. 1 positions.

Flexible tube 26 has a rigid end fitting 48 formed with a circumferential groove 49. When collar 43 rotates to a specific position on pipe 40 the end fitting 47 can be inserted into the lower end of pipe 40, after which collar 43 can be rotated to force plungers 41 into a locked condition on end fitting 48. When mandrel 13 has been loaded with fastener collars 11, collar 43 can be rotated to detach tube 26 from housing 15.

As shown in FIG. 3, nose piece 27 is detachably connected to a tubular mandrel 13 formed of a flexible plastic material. The lower end of magnetized rod 29 extends downwardly from the nose piece for insertion into the mandrel. The nose piece is thus frictionally retained on the mandrel, such that the nose piece can be reused with other similarly constructed mandrels.

The drawings necessarily show a particular embodiment of the invention. However, it will be appreciated that the invention can be practiced in various different constructional configurations and structural assemblies.

What is claimed is:

1. A an apparatus for assembling annular fastener collars onto a flexible mandrel, comprising:
   a housing having a passage formed therein;
   means for feeding annular fastener collars into said passage;
   a nose piece disposed within said passage and removably connected onto said flexible mandrel positioned within said passage of said housing for guiding said fastener collars onto said mandrel; and
   magnetic means carried by said housing and said noise piece for centering said nose piece in said passage.

2. The apparatus of claim 1, wherein said magnetic means comprises an elongated magnetized rod carried within said nose piece.

3. The apparatus of claim 1, wherein said magnetic means comprises an annular magnet assembly carried by the housing in surrounding relation to said passage.

4. The apparatus of claim 1, further comprising a flexible tube releasably connected to said housing, said tube surrounding said mandrel so as to define an annular space between said tube and said mandrel for receiving said fastener collars.

5. The apparatus of claim 1, wherein said nose piece is detachably connected to said mandrel, said magnetic centering means comprising an elongated rod extending axially within said nose piece, said rod extending from said nose piece to form a means for attachment of said nose piece to said mandrel.

6. The apparatus of claim 5, wherein said mandrel comprises a tubular shape, and said elongated rod is sized to frictionally fit into said tubular mandrel.

7. The apparatus of claim 5, wherein said magnetic centering means comprises a series of individual magnets mounted within said housing in a circumferential pattern around the axis of said passage, said individual magnets being polarized along radial lines generated from the axis of said passage so that the inner and outer edges of said magnets are of different polarity, said elongated magnetized rod having a first end that is magnetized to have the same polarity as the inner ends of said individual magnets whereby the nose piece is centered due to a magnetic repulsion action.

8. The apparatus of claim 1, wherein said magnetic means comprises an elongated magnetized rod carried within the nose piece, and an annular magnet assembly carried by the housing in surrounding relation to said passage and said rod.

9. The apparatus of claim 8, wherein magnetic polarities of said rod and said annular magnet assembly are such that the rod is magnetically repulsed from the annular magnet assembly.

10. The apparatus of claim 9, wherein said annular magnet assembly comprises a plural number of individual magnets arranged in a circumferential pattern around said passage.

11. The apparatus of claim 10, wherein said magnetized rod has a first end portion located within the plane of the annular magnet structure and a second end portion located out of the plane of the annular magnet structure.

12. The apparatus of claim 10, wherein said individual magnets have segmental configurations, said individual magnets having divergent side edges that radiate away from the passage axis, said segmental magnets having side edges thereof abutted together so that said segmental magnets entirely surround said nose piece.

13. The apparatus of claim 12, wherein each segmental magnet has an inner arcuate surface in axial alignment with said passage, whereby said inner arcuate surfaces form smooth continuations of said passage.

14. The apparatus of claim 12, wherein each one of said individual magnets is polarized along radial lines generated from the axis of said passage.

15. The method of magnetically centering a fastener collar flexible mandrel within a collar feeding apparatus which includes a housing having a passage formed therein, means for feeding said fasteners into said passage, and a nose piece disposed within said passage and connected to said mandrel for guiding said collars onto said mandrel, and means carried by said housing and said nose piece for magnetically centering said nose piece in said housing, said method comprising:
  providing first magnetic means in the housing of said collar feeding apparatus;
  providing second magnetic means on said nose piece;
  attaching said nose piece carrying said second magnetic means onto said flexible mandrel; and
  centering said nose piece within said passage by magnetic repulsion between said first and second magnetic means.

* * * * *